United States Patent [19]
Lin

[11] Patent Number: 5,364,024
[45] Date of Patent: Nov. 15, 1994

[54] APPLICATION INDEPENDENT, PORTABLE ROOM TEMPERATURE AND HUMIDITY CONTROLLER

[76] Inventor: Feng Lin, 29176 Hemlock Ct., Farmington Hills, Mich. 48336

[21] Appl. No.: 57,873

[22] Filed: May 7, 1993

[51] Int. Cl.⁵ ........................ B01F 3/02; G05D 21/00
[52] U.S. Cl. .................................. 236/44 C; 62/176.6; 165/27
[58] Field of Search ..................... 62/176.6; 236/44 C; 165/27, 21

[56] References Cited

U.S. PATENT DOCUMENTS

| | | | |
|---|---|---|---|
| 3,785,165 | 1/1974 | Valenzuela, Jr. | 62/261 |
| 3,815,815 | 6/1974 | Sapir | 165/26 |
| 4,687,050 | 8/1987 | Podlipnik | 165/27 |
| 5,000,381 | 3/1991 | Mueller et al. | 236/44 C |

Primary Examiner—William E. Wayner

[57] ABSTRACT

A portable temperature and humidity controller which has a temperature sensor, a humidity sensor, temperature and humidity setpoint device, a transformer, a male plug for insertion into a wall outlet and a female outlet into which the controlled air conditioner plugs in with a manual switch to control the air conditioner using one of the humidity or temperature sensor.

15 Claims, 3 Drawing Sheets

APPLICATION INDEPENDENT, PORTABLE ROOM TEMPERATURE AND HUMIDITY CONTROLLER

BACKGROUND OF THE INVENTION

This invention relates to a room temperature and humidity controller, which is portable and can be used to control different types of heaters, air conditioners, humidifiers, or dehumidifiers, having a temperature sensor, a desired temperature setting mechanism, a temperature controlled switch, a humidity sensor, a desired humidity setting mechanism, a humidity controlled switch,, a transformer, a AC/DC converter, and a relay, all connected and located in a housing.

Temperature controllers such as the thermostat described in U.S. Pat. No. 3,821,682 have been widely use today. The most common type of temperature controllers is not portable: they are usually mounted on walls.

The other common type of temperature controllers is those that are mounted on the surfaces of heaters or air conditioners. A temperature controller of this type cannot control the temperature of an entire room accurately, because the temperature near the heater or air conditioner can vary widely from the temperatures of the other parts of the room.

Furthermore temperature controllers of the above two types are designed for a particular application: one temperature controller controls a specific heater or air conditioner.

Only few temperature controllers of portable, application independent nature have been patented. A specific reference is given to U.S. Pat. No. 4,687,050, where a housing contains two thermostats. The thermostats are interwired so as enable one thermostat to control a heating operation and the other to control a cooling operation. However, as to be described below, the use of the referred invention is rather limited to applications that have very different objectives than those of the current invention.

It is the first objective of the invention to provide an integrated rated controller can control both temperature and humidity.

It is the second objective of the invention to provide a safe temperature and humidity controller that separates electrical devices and temperature/humidity sensing devices into two compartments, the first compartment surrounded with electrical insulating walls and the second compartment designed to facilitate air circulation.

It is the third objective of the invention to provide a portable temperature and humidity controller that can be moved easily from one room to another.

It is the fourth objective of the invention to provide a temperature and humidity controller that can be placed in the part of a room where the temperature/humidity is of most importance.

It is the fifth objective of the invention to provide a temperature and humidity controller that can be used to control different types of heaters, air conditioners, humidifiers and dehumidifiers.

The main use of the invention is controlling the temperature/humidity of a particular room of importance in a building at a different level than the rest of the building for the purpose of energy saving.

BRIEF SUMMARY OF THE INVENTION

The above objectives can be achieved by the invented temperature and humidity controller operating in one of the four modes: high temperature (mode 1), low temperature (mode 2), high humidity (mode 3), low humidity (mode 4). The housing of the temperature and humidity controller is partitioned into two compartment. Located in the front compartments are: a temperature/humidity sensor, a desired temperature/humidity setting device, an temperature/humidity indicator, and an power on/off indicator. The wall of the front compartment is designed to facilitate air circulation. Located in the rear compartment are: a transformer for obtaining low AC voltage from a conventional AC outlet, an AC/DC converter, a relay, a power on/off switch, a temperature/humidity switch, a high/low switch and a female receptacle to be connected to a heater, air conditioner, humidifier, or dehumidifier.

These components are interconnected so that, for example, when the power is on and high temperature mode (mode 1) is selected, then the female receptacle will supply power to the connected heater if the temperature of surrounding air is below the desired temperature.

This controller is particularly useful to control the temperature/humidity in a child's room at a comfort level, while the temperature/humidity of the rest of the building is set at a different and energy saving level.

DETAILED DESCRIPTION

Figure 1:
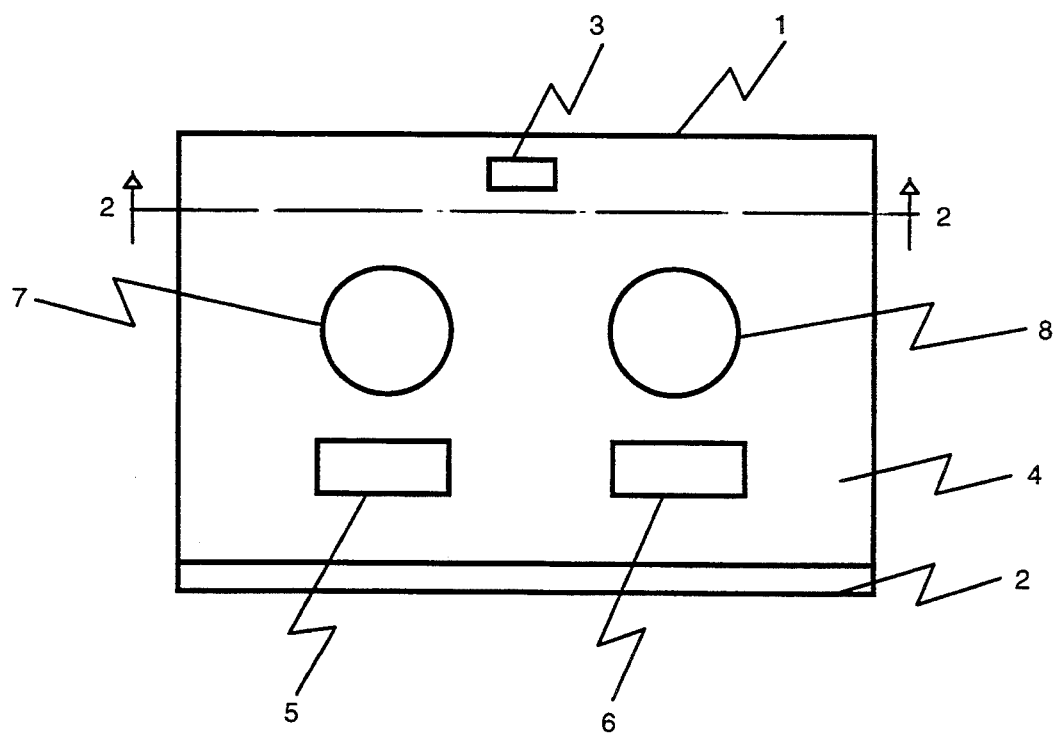
FIG. 1 is a side elevational view of the preferred embodiment of the invention.

Turning to FIG. 1, the temperature and humidity controller of this invention is a rectangular device having a housing 1 sitting on a base 2 made of materials of good heat insulation for the purpose of eliminating a temperature interference by the table on which the controller is placed. A power on/off indicator 3 is mounted on the front plate 4 of the housing 1 to indicate whether the power switch is on or off. Also mounted on the front plate 4 are: a temperature indicator 5 displaying the temperature of surrounding air; and a humidity indicator 6 displaying the humidity of surrounding air.

Before the front plate 4, there are disposed two rotatable knobs 7 and 8, externally of the housing 1. The knob 7 is of a conventional mechanism and is used here to set the desired temperature. The knob 8 of the same mechanism is used here to set the desired humidity. Other mechanisms of similar functions may also be used.

Figure 2:
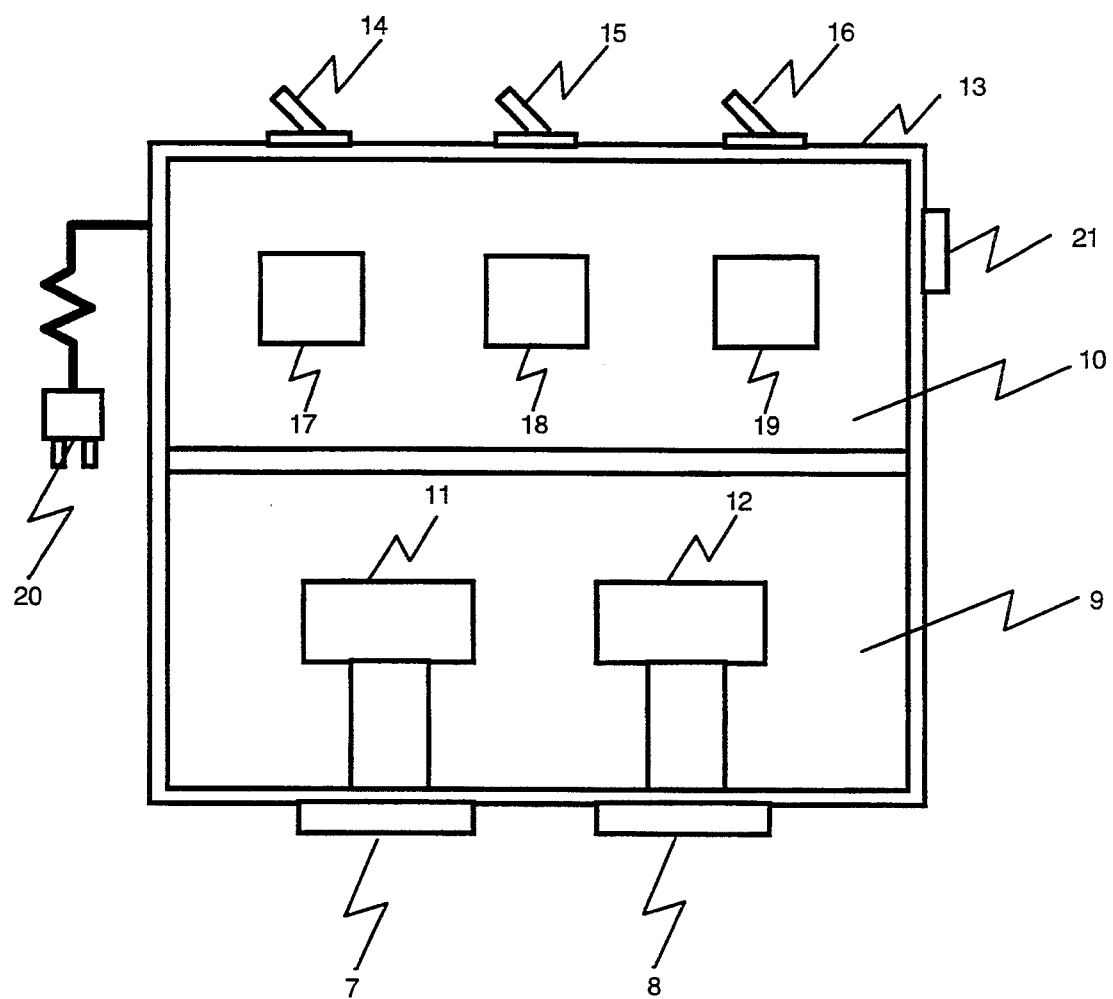
FIG. 2 is a sectional plan view taken along line 2—2 of FIG. 1.

Next turning to FIG. 2, the housing 1 is partitioned into two compartments: the front compartment 9 and the rear compartment 10.

A temperature sensor, a desired temperature setting device and a temperature controlled switch are often built into one unit 11. There are several types of such units available commercially. Similarly, a humidity sensor, a desired humidity setting device and a humidity controlled switch are built into one commercially available unit 12. Both unit 11 and unit 12 are mounted inside the front compartment 9. To facilitate air circulation, the side walls of the front compartment have holes or openings.

The walls of the rear compartment 10 are made of materials of very good electrical insulation to ensure the safety of occupants of the room (most likely children).

A transformer 17, an AC/DC converter 18, and a relay 19 are mounted inside the rear compartment 10. The functions of these devices will be described in detail below.

On the rear plate 13 of the housing 1, three switches are mounted: a power on/off switch 14, a temperature/humidity switch 15, and a high/low switch 16.

The housing 1 is also associated with an AC male receptacle coupled to a line cord 20. The receptacle is to be plugged into any convenient AC wall outlet to supply power to the controller and the heater, air conditioner, humidifier, or dehumidifier it controls. The heater, air conditioner, humidifier, or dehumidifier is connected to the controller by means of a female receptacle 21, mounted on a side wall of the rear compartment 10.

Figure 3:
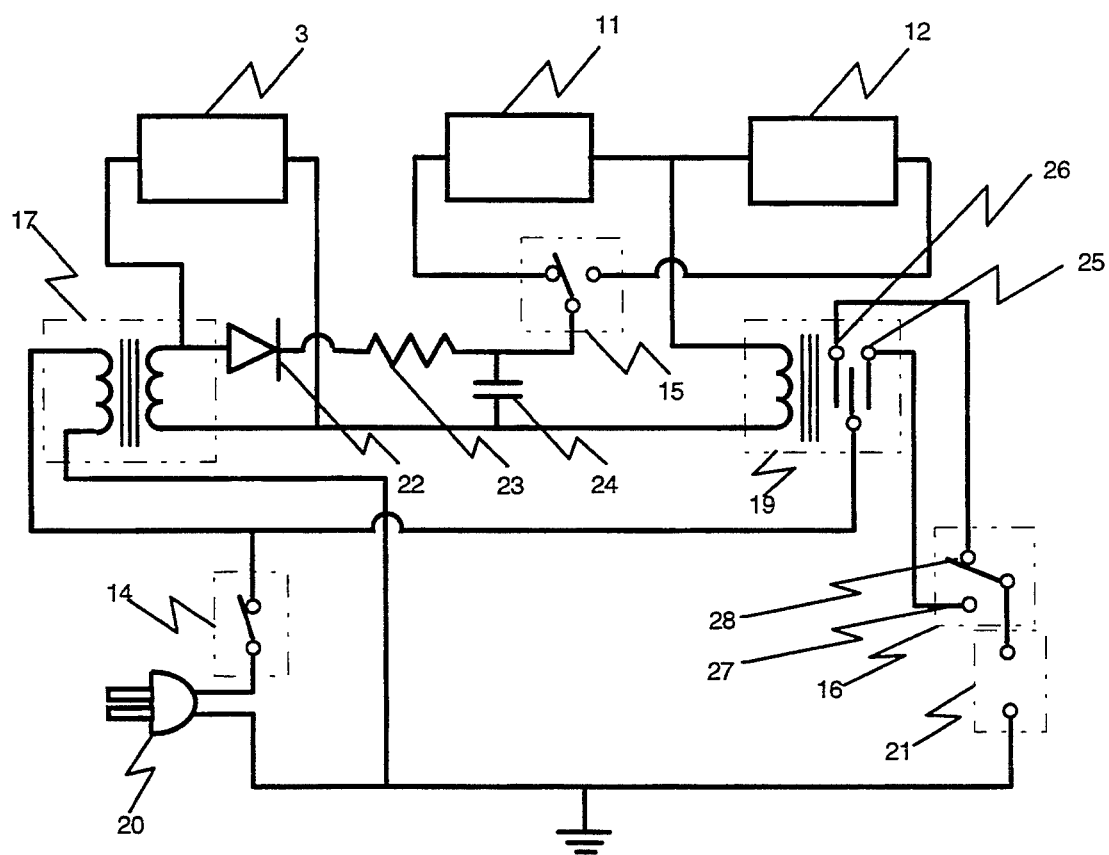
FIG. 3 is a circuit diagram showing the connection among components needed to accomplish the described operation.

Now turning to FIG. 3. The input power of the controller is obtained from an AC wall outlet by means of the line cord 20. The switch 14 is used to turn on or off the power. When the switch 14 is on, a high AC voltage (115 V) is connected to the transformer 17, whose output is a low AC voltage of 5 V-10 V. The reason for using the low voltage is to ensure the safety of occupants of the room. This low AC voltage is connected to the power on/off indicator 3. Also, this low AC voltage is converted to a low DC voltage by the AC/DC converter consisting of a diode 22, a resistor 23, and a capacitor 24. The converted low DC voltage is connected either to the temperature controlled switch in the unit 11, or to the humidity controlled switch in the unit 12, selected by the temperature/humidity switch 15.

The temperature controlled switch has the following characteristics: it is on when the temperature of surrounding air is higher than the desired temperature; it is off otherwise. The humidity controlled switch has a similar characteristics: it is on when the humidity of surrounding air is higher than the desired humidity; it is off otherwise.

If the temperature/humidity controlled switch is off (i.e. the temperature/humidity of surrounding air is lower than the desired temperature/humidity), then no voltage is applied between the first input terminal 29 and the second input terminal 30 of the relay 19. In this case, the relay is at position 25, connecting the AC power to the female receptacle 21 through the first output terminal 31 and the third output terminal 25 of the relay 19, and activating the heater/humidifier, if the high/low switch 16 is set at position 27.

Similarly, if the temperature/humidity controlled switch is on (.i.e. the temperature/humidity of surrounding air is higher than the desired temperature/humidity), the relay is at position 26, connecting the AC power to the female receptacle 21 through the first output terminal 31 and the second output terminal 26 of the relay 19, and activating the air conditioner/dehumidifier, if the high/on switch 16 is set at position 28.

It is understood that the above description of the current invention is susceptible to several modifications and adaptations, and the same are intended to be comprehended within the meaning and range of equivalents of the appended claims.

What is claimed is:

1. A temperature and humidity controller operating at first mode, second mode, third mode, or fourth mode, comprising:

a temperature unit having temperature sensing means, setable adjustable temperature setting means, and temperature switching means responsive to said temperature sensing means and temperature setting means to provide a connection between two terminals of said temperature unit for a temperature above said temperature set;

a humidity unit having humidity sensing means, setable adjustable humidity setting means, and humidity switching means responsive to said humidity sensing means and humidity setting means to provide a connection between two terminals of said humidity unit for a humidity above said humidity set;

means for displaying the temperature of surrounding air;

means for displaying the humidity of surrounding air;

a male receptacle to be connected to a conventional AC outlet for supplying a high AC voltage;

a transformer transforming said high AC voltage to a low AC voltage;

an AC/DC converter converting said low AC voltage to a low DC voltage;

a relay having first and second input terminals, first, second and third output terminals, closed switching means to provide connection between said first output terminal and said second output terminal when said low DC voltage is applied between said first input terminal and said second input terminal, and open switching means to provide connection between said first output terminal and said third output terminal when no voltage is applied between said first input terminal and said second input terminal;

means for connecting said low DC voltage to said first and second input terminals, controlled by said temperature switch means, when operating at said first mode or said second mode;

means for connecting said low DC voltage to said first and second input terminals, controlled by said humidity switch means, when operating at said third mode or said fourth mode;

a female receptacle for supplying said high AC voltage to a load;

means for connecting said high AC voltage to said female receptacle, controlled by said open switching means, when operating at said first mode or said third mode.

means for connecting said high AC voltage to said female receptacle, controlled by said closed switching means, when operating at said second mode or said fourth mode;

2. The temperature and humidity controller according to claim 1, wherein said temperature unit is operated at said low DC voltage.

3. The temperature and humidity controller according to claim 1, wherein said humidity unit is operated at said low DC voltage.

4. The temperature and humidity controller according to claim 1, wherein said means for displaying temperature is operated at said low DC voltage.

5. The temperature and humidity controller according to claim 1, wherein said means for displaying humidity is operated at said low DC voltage.

6. The temperature and humidity controller according to claim 1, wherein said lamp is operated at said low AC voltage.

7. The temperature and humidity controller according to claim 1, further including means for selecting between operating at said first mode or said second mode and operating at said third mode or said fourth mode.

8. The temperature and humidity controller according to claim 1, further including means for selecting between operating at said first mode or said third mode and operating at said second mode or said fourth mode.

9. The temperature and humidity controller according to claim 1, further having a housing sitting on a base and partitioned into front compartment and rear compartment.

10. The temperature and humidity controller according to claim 9, wherein said temperature unit, and said humidity unit are located in said front compartment.

11. The temperature and humidity controller according to claim 9, wherein said transformer, said AC/DC converter, and said relay are located in said rear compartment.

12. The temperature and humidity controller according to claim 9, wherein said base is made of materials of good heat insulation.

13. The temperature and humidity controller according to claim 9, wherein side walls of said front compartment have holes or openings.

14. The temperature and humidity controller according to claim 9, wherein walls of said rear compartment are made of materials of very good electrical insulation.

15. The temperature and humidity controller according to claim 9, whose weight is less than 5 pounds.

* * * * *